United States Patent
Andry et al.

(10) Patent No.: US 10,431,828 B2
(45) Date of Patent: Oct. 1, 2019

(54) MICROBATTERY WITH THROUGH-SILICON VIA ELECTRODES

(71) Applicant: INTERNATIONAL BUSINESS MACHINES CORPORATION, Armonk, NY (US)

(72) Inventors: Paul S. Andry, Yorktown Heights, NY (US); Bucknell C. Webb, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 15/168,330

(22) Filed: May 31, 2016

(65) Prior Publication Data

US 2017/0346097 A1    Nov. 30, 2017

(51) Int. Cl.
  *H01M 6/40*  (2006.01)
  *H01M 4/62*  (2006.01)
  *H01M 2/26*  (2006.01)
  *H01M 2/08*  (2006.01)
  *H01M 4/02*  (2006.01)

(52) U.S. Cl.
  CPC ............ *H01M 4/624* (2013.01); *H01M 2/08* (2013.01); *H01M 2/26* (2013.01); *H01M 6/40* (2013.01); *H01M 2004/021* (2013.01); *H01M 2220/30* (2013.01)

(58) Field of Classification Search
  None
  See application file for complete search history.

(56) References Cited

U.S. PATENT DOCUMENTS

| 9,123,954 B2 | 9/2015 | Nathan |
| 2003/0020072 A1* | 1/2003 | Higgins ............ H01L 21/31691 257/78 |
| 2008/0153000 A1 | 6/2008 | Salot et al. |

(Continued)

FOREIGN PATENT DOCUMENTS

| CN | 1787232 | 6/2006 |
| CN | 102097148 | 6/2011 |

OTHER PUBLICATIONS

International Search Report for PCT/IB2017/053041 dated Sep. 8, 2017 (3 pages).

(Continued)

*Primary Examiner* — Wojciech Haske
(74) *Attorney, Agent, or Firm* — Tutunjian & Bitetto, P.C.; Erik Johnson

(57) ABSTRACT

Batteries and methods of forming the same include an anode structure, a cathode structure, and a conductive overcoat. The anode structure includes an anode substrate, an anode formed on the anode substrate, and an anode conductive liner that is in contact with the anode. The cathode structure includes a cathode substrate, a cathode formed on the cathode substrate, and a cathode conductive liner that is in contact with the cathode. The conductive overcoat is formed over the anode structure and the cathode structure to seal a cavity formed by the anode structure and the cathode structure. At least one of the anode substrate and the cathode substrate is pierced by through vias that are in contact with the respective anode conductive liner or cathode conductive liner.

20 Claims, 10 Drawing Sheets

(56) References Cited

U.S. PATENT DOCUMENTS

2008/0248382 A1   10/2008   Sastry et al.
2010/0129717 A1    5/2010   Bedjaoui et al.
2015/0280288 A1* 10/2015   Rajaraman .......... H01M 2/0202
                                                               429/7

OTHER PUBLICATIONS

Golodnitsky, et al., Advanced materials for the 3D microbattery, Journal of Power Sources 153 (2006) 281-287.
Edström, et al., Electrodeposition as a Tool for 3D Microbattery Fabrication, The Electrochemical Society Interface • 2011, pp. 41-47.
Kravitz, et al., Silicon/Pyrex Planar Microbattery—A Silicon Process-Compatible Micro-Power Source, Sand Report, SAND2002-4175, Unlimited Release, Feb. 2003, pp. 1-13.

\* cited by examiner

MICROBATTERY WITH THROUGH-SILICON VIA ELECTRODES

BACKGROUND

Technical Field

The present invention generally relates to batteries and, more generally, to microbatteries having electrical contacts that have metal overcoats and through-silicon via electrical contacts.

Description of the Related Art

There is growing demand for small, low-profile power sources having charge capacity on the order of, e.g., 1 mAh or less. While functional batteries of this size can be fabricated relatively easily, the small physical dimensions and low profile involved make it difficult to fully and hermetically seal such batteries. Certain battery chemistries, particularly those based on lithium, cannot be exposed to moisture. Wet-chemistry batteries are sealed to retain water and other electrolytes.

Existing commercial solutions are either metal can type packages of cylindrical symmetry with crimped seals, or flexible polymer packages with very wide seal widths of several millimeters. Certain long-life lithium ion batteries employ glass-to-metal seals to ensure full hermeticity. However, very few packaging options exist for creating a quality seal of 100 μm width or less.

SUMMARY

A battery includes an anode structure, a cathode structure, and a conductive overcoat. The anode structure includes an anode substrate, an anode formed on the anode substrate, and an anode conductive liner that is in contact with the anode. The cathode structure includes a cathode substrate, a cathode formed on the cathode substrate, and a cathode conductive liner that is in contact with the cathode. The conductive overcoat is formed over the anode structure and the cathode structure to seal a cavity formed by the anode structure and the cathode structure. At least one of the anode substrate and the cathode substrate is pierced by through vias that are in contact with the respective anode conductive liner or cathode conductive liner.

A method of forming a battery includes forming an anode substrate and forming a cathode substrate. Through vias are formed in at least one of the anode substrate and the cathode substrate that pierce the respective substrate. An anode conductive liner is formed on the anode structure. An anode is formed on the anode conductive liner. A cathode conductive liner is formed on the cathode substrate. A cathode is formed on the cathode conductive liner. The anode substrate and the cathode substrate are assembled to form a battery structure. A conductive overcoat is formed over the anode substrate and the cathode substrate to seal a cavity formed by the anode substrate and the cathode substrate.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide microbatteries that use a metal coating for sealing the battery components from exposure to air and moisture. To accomplish this, electrical vias are formed through the backs of the anode and cathode, so that electrical contact may be made from the top and bottom of the device, rather than from the side. This provides electrical access without the risk of shorting the anode to the cathode through the metal coating.

Figure 1:
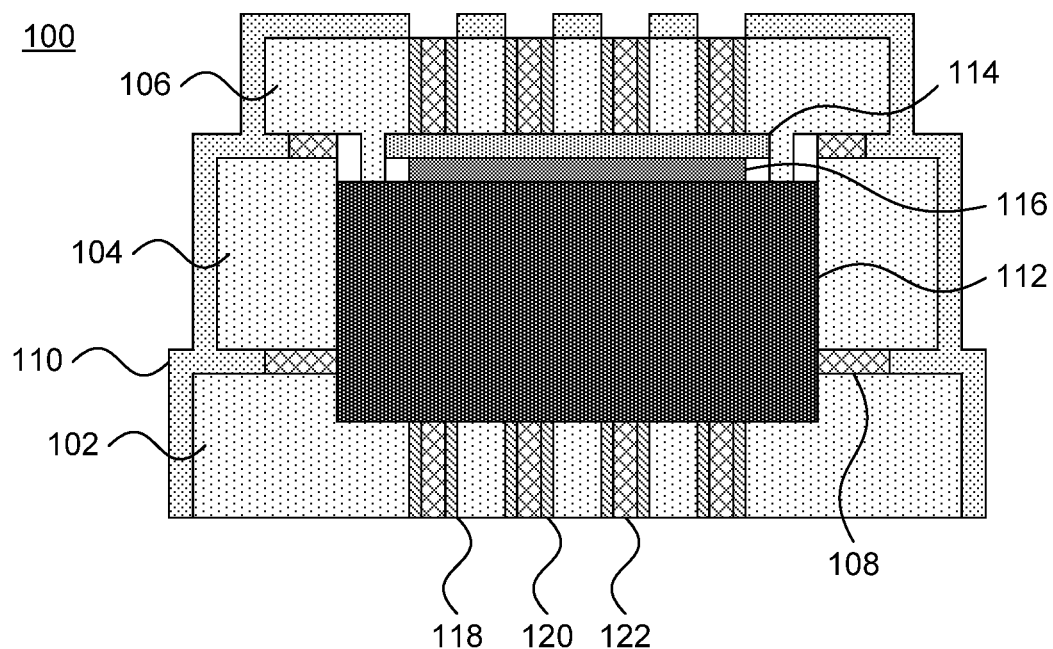
FIG. 1 is a diagram with a cut-away of a microbattery structure in accordance with the present principles.

Referring now to FIG. 1, a microbattery structure 100 is shown in accordance with the present embodiments. The microbattery structure 100 includes a three-piece construction that is based on the cathode structure 102, walls 104, and anode structure 106. In an alternative, two-piece embodiment, the walls 104 may be integrally formed with the cathode structure 102 or the anode structure 106. The cathode structure 102, the walls 104, and the anode structure 106 are bonded to one another by adhesive points 108.

A cathode 112 fills the space between the walls 104 and connects to the cathode structure 102. Similarly, an anode 114 connects to the anode structure 106. An electrolyte-infused spacer 116 prevents the cathode 112 from touching the anode 114 and provides a space for the electrochemical reaction to take place. The microbattery structure 100 is sealed within a metal case 110.

It should be understood that, instead of an adhesive 108, a metallic solder joint may be used for the joint either between the anode structure 106 and the walls 104 or between the walls 104 and the cathode structure 102. Such a metal joint obviates the need for vias on its respective structure, as the conductive metal forms an electrical connection between the respective structure and the metal case 110. Suitable metals for the metal joint may include, e.g., indium or a low melting point solder including indium, tin, lead, bismuth, cadmium, silver, gold, or a combination of the above. It is specifically contemplated that indium, lead-tin eutectic solder, or gold may be used. In one particular embodiment, it is contemplated that an adhesive may be used to join the walls 104 to the cathode structure 102 and that a metal joint may be used to join the anode structure 106 to the walls 104.

Vias 118 are formed in the cathode structure 102 and the anode structure 106. The vias 118 include a conductive lining 120 and an insulating fill 122. The vias 118 provide electrical access to the cathode 112 without having to come into contact with the metal case 110. The vias 118 ensure an electrical connection between the anode 114 and the metal case 110 for designs where the metal case 110 is part of the anode electrode and also allow an option where the metal case 110 is electrically isolated from the case, where gaps in the metal case 110 are provided to allow electrical access.

In one embodiment, a diameter of the anode structure 106 is smaller than a diameter of the walls 104, which in turn is smaller than a diameter of the cathode structure 102. Each part thereby leaves exposed a rim of material from the part below it. This ensures that the metal case 110, the material for which is deposited from above, overcoats the adhesive 108. With conformal metal depositions this may not be needed, and so some embodiments will have diameters of the respective parts that are the same.

Figure 2:
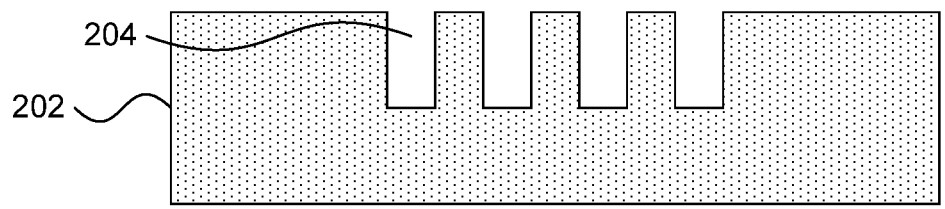
FIG. 2 is a diagram of a step in the formation of a cathode structure in accordance with the present principles.
Figure 7:
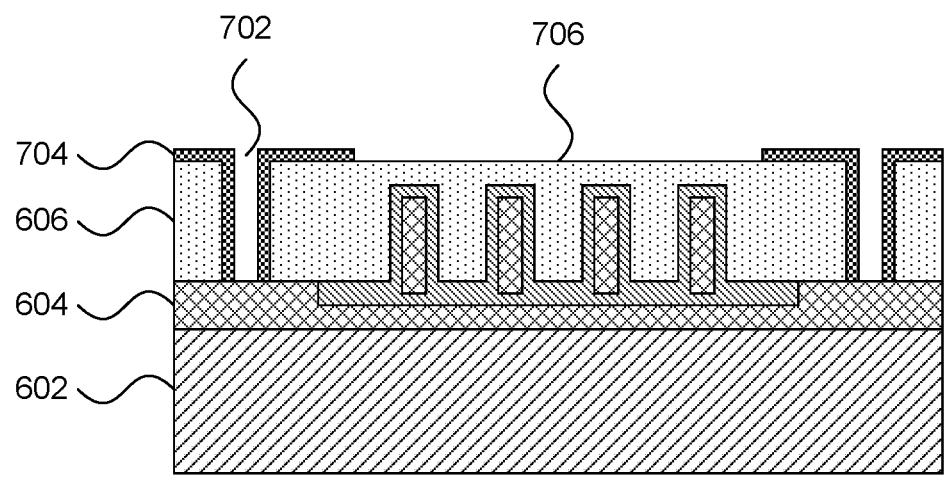
FIG. 7 is a diagram of a step in the formation of a cathode structure in accordance with the present principles.

Referring now to FIG. 2, a step in the formation of a cathode structure 102 is shown. Wells 204 are formed in a substrate 202. It is specifically contemplated that silicon may be used to form the substrate 202, but it should be understood that any appropriate material may be used in its place. When semiconducting or conducting materials are used for the substrate, the substrate is coated with an insulating dielectric (FIG. 7, 704). Photolithography may be used to define the well pattern and a deep reactive ion etch (DRIE) may be used to etch the wells 204 in the substrate 202.

A photolithographic pattern is produced by applying a photoresist to the surface to be etched; exposing the photoresist to a pattern of radiation; and then developing the pattern into the photoresist utilizing a resist developer. Once the patterning of the photoresist is completed, the sections covered by the photoresist are protected while the exposed regions are removed using a selective etching process that removes the unprotected regions. As used herein, the term "selective" in reference to a material removal process denotes that the rate of material removal for a first material is greater than the rate of removal for at least another material of the structure to which the material removal process is being applied.

Reactive ion etching (RIE) is a form of plasma etching in which during etching the surface to be etched is placed on a radio-frequency powered electrode. Moreover, during RIE the surface to be etched takes on a potential that accelerates the etching species extracted from plasma toward the surface, in which the chemical etching reaction is taking place in the direction normal to the surface. Other examples of anisotropic etching that can be used at this point of the present invention include ion beam etching, plasma etching or laser ablation. DRIE is a form of plasma etching that may be used to form high aspect ratio structures with vertical etch profiles. It is specifically contemplated that a Bosch process may be used for the DRIE, although other embodiments are also contemplated.

Figure 3:
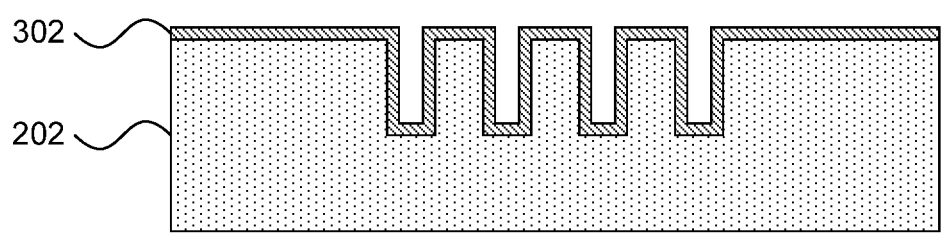
FIG. 3 is a diagram of a step in the formation of a cathode structure in accordance with the present principles.

Referring now to FIG. 3, a step in the formation of a cathode structure 102 is shown. A liner 302 is formed in the wells 204 and on the surface of the substrate 202. It is specifically contemplated that the liner 302 may be formed from titanium or titanium nitride, though it is contemplated that other conductive liner materials may be used, such as tantalum or tungsten. The liner 302 may have an exemplary thickness of about 300 nm to about 1,000 nm and is formed using a conformal deposition process, such as chemical vapor deposition (CVD).

CVD is a deposition process in which a deposited species is formed as a result of chemical reaction between gaseous reactants at greater than room temperature (e.g., from about 25° C. about 900° C.). The solid product of the reaction is deposited on the surface on which a film, coating, or layer of the solid product is to be formed. Variations of CVD processes include, but are not limited to, Atmospheric Pressure CVD (APCVD), Low Pressure CVD (LPCVD), Plasma Enhanced CVD (PECVD), and Metal-Organic CVD (MOCVD) and combinations thereof may also be employed.

Figure 4:
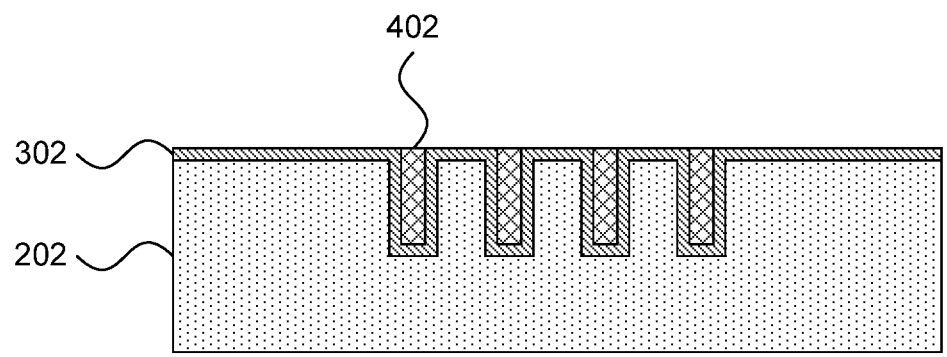
FIG. 4 is a diagram of a step in the formation of a cathode structure in accordance with the present principles.

Referring now to FIG. 4, a step in the formation of a cathode structure 102 is shown. A fill 402 is formed in the wells 204 from, e.g., a bonding polymer. The fill 402 is formed by, e.g., bonding the surface of the substrate 202 to another surface to force the bonding polymer into the wells 204 and then debonding the other surface. It is specifically contemplated that the fill 402 may be formed using an insulating material, although non-insulating embodiments are also contemplated.

Figure 5:
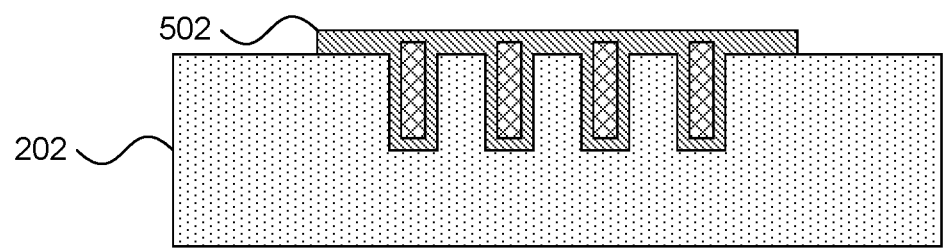
FIG. 5 is a diagram of a step in the formation of a cathode structure in accordance with the present principles.

Referring now to FIG. 5, a step in the formation of a cathode structure 102 is shown. Additional metal is conformally deposited on the liner 302 and over the wells 204. The additional metal may have a thickness of about 300 nm and may be formed from a titanium seed layer or, alternatively, a multilayer of titanium, copper, and titanium or of titanium, nickel, copper, and hold. Further metal such as copper and/or nickel can be deposited by electroplating through a photoresist mask to form a cathode contact pad for the battery. The seed metal not under the pad can be removed with RIE or a wet etch using the electroplated metal as a hard mask.

Electroplating processes include depositing a thin blanket of seed metal and masking the seed metal with a photoresist to leave exposed only the regions where metal is needed. Metal is then plated onto the exposed metal regions to create a metal region that does not extend into regions without exposed seed metal. The photoresist is then stripped and the seed layer is removed in the previously covered areas using a wet or dry etch or using RIE. The plated film is thicker than the seed layer, so the seed layer disappears first in the etch.

Figure 6:
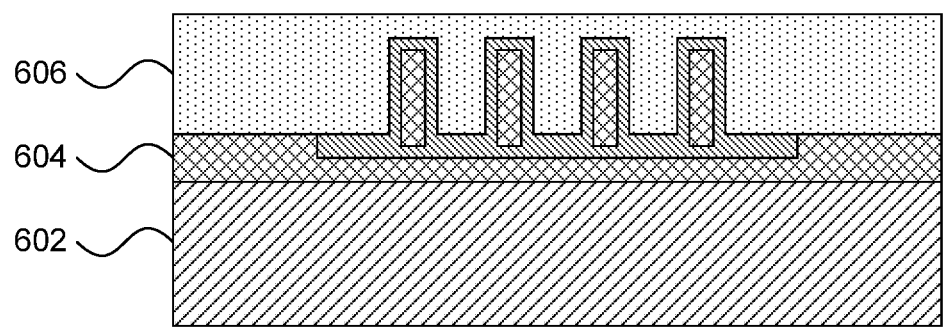
FIG. 6 is a diagram of a step in the formation of a cathode structure in accordance with the present principles.

Referring now to FIG. 6, a step in the formation of a cathode structure 102 is shown. The substrate 202 is bonded to a handler 602 that may be formed from any appropriate material such as, e.g., glass or silicon. The bond is formed using, for example, a polymer bonding agent 604, though it should be understood that any suitable bonding agent may be used. The substrate 202 is then thinned down to thinned substrate 606 using any appropriate process such as, e.g., chemical mechanical planarization.

CMP is performed using, e.g., a chemical or granular slurry and mechanical force to gradually remove upper layers of the device. The slurry may be formulated to be unable to dissolve, for example, the work function metal layer material, resulting in the CMP process's inability to proceed any farther than that layer.

Referring now to FIG. 7, a step in the formation of a cathode structure 102 is shown. Isolation channels 702 are formed in the thinned substrate 606 using, e.g., photolithographic patterning and DRIE to form cathode substrate 706. An oxide layer 704 may be formed in the isolation channels 702 and on the top surface of the cathode substrate 706. The oxide layer may be formed using any appropriate oxidation process and may be initially formed across the entire surface of the cathode substrate 706 and then patterned to expose regions of the surface of the cathode substrate 706 above the wells 204.

Figure 8:
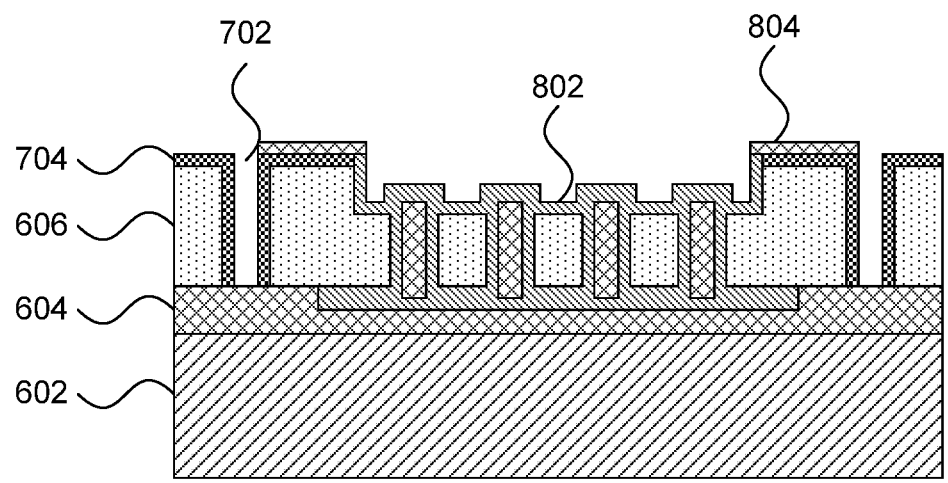
FIG. 8 is a diagram of a step in the formation of a cathode structure in accordance with the present principles.

Referring now to FIG. 8, a step in the formation of a cathode structure 102 is shown. The exposed portions of the cathode substrate 706 are etched down below the level of the via fill 402 and an additional layer of liner material is formed on the exposed surfaces to form liner 802. As noted above, it is specifically contemplated that the liner 802 may be formed from, e.g., titanium or titanium nitride.

After the liner 802 has been formed, adhesive seal rings 804 around the battery cavity are formed by, e.g., spinning on a photopatternable polymer thermoplastic adhesive. The adhesive material is exposed, developed, and cured to form the adhesive ring 804. It should be noted that, in an alternative embodiment, the adhesive rings 804 may be applied to, e.g., walls 104.

Figure 22:
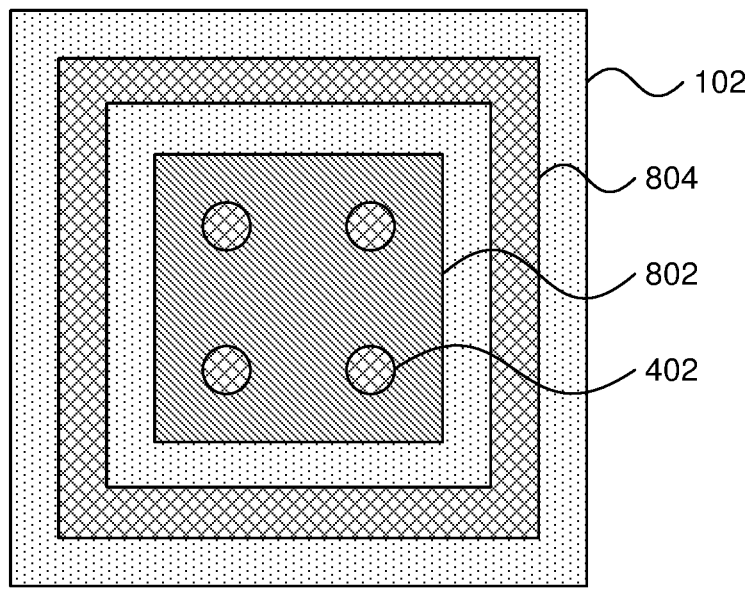
FIG. 22 is a top-down view of a cathode structure in accordance with the present principles.

Referring now to FIG. 22, a top-down view of the cathode structure 102 is shown. As can be seen from this view, the adhesive forms a ring 804 around the entire center area of the cathode, thereby forming a hermetic seal when assembled.

Figure 9:
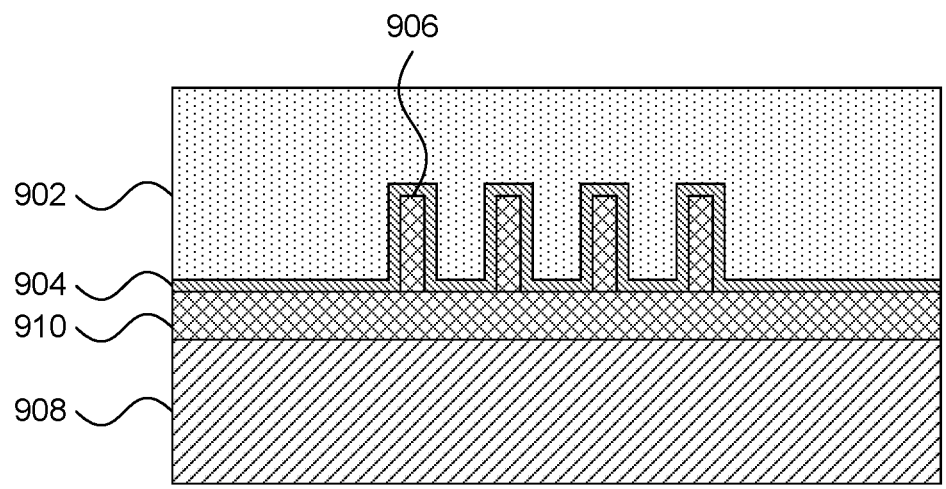
FIG. 9 is a diagram of a step in the formation of an anode structure in accordance with the present principles.

Referring now to FIG. 9, a step in the formation of an anode structure 106 is shown. Formation of the anode structure 106 to this point follows FIGS. 2, 3, and 4 above, with the formation of wells in a substrate 902, the conformal deposition of a liner 904 in the wells, and the formation of fill 906 in the wells over the liner 904. The substrate 902 is then bonded to handler 908 using, for example, a polymer bonding agent 908. The polymer bonding agent may, in one embodiment, be used to form the fill 906 by forcing the bonding agent into the wells.

Figure 10:
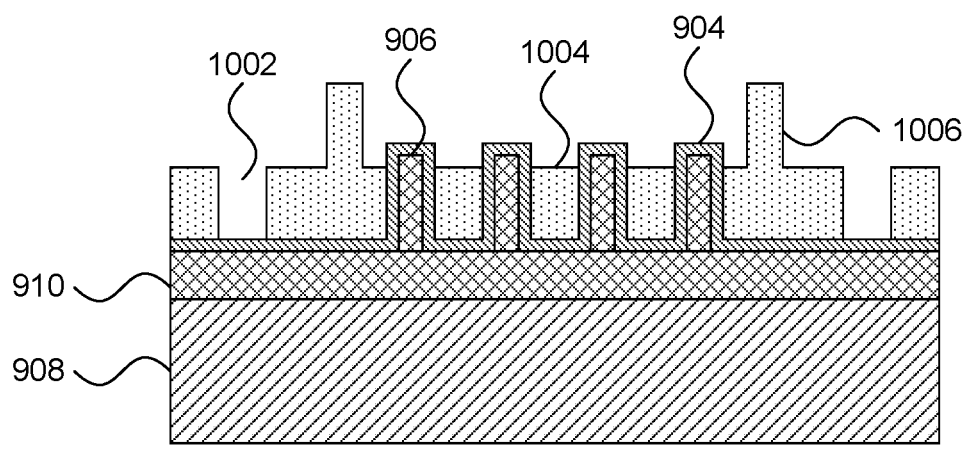
FIG. 10 is a diagram of a step in the formation of an anode structure in accordance with the present principles.

Referring now to FIG. 10, a step in the formation of an anode structure 106 is shown. Isolation channels 1002 are formed in the substrate 902 using, e.g., photolithographic patterning and RIE. Additional etching is performed to expose the vias' liner 904 and to form alignment rim 1006. The anode structure 1004 remains.

Figure 11:
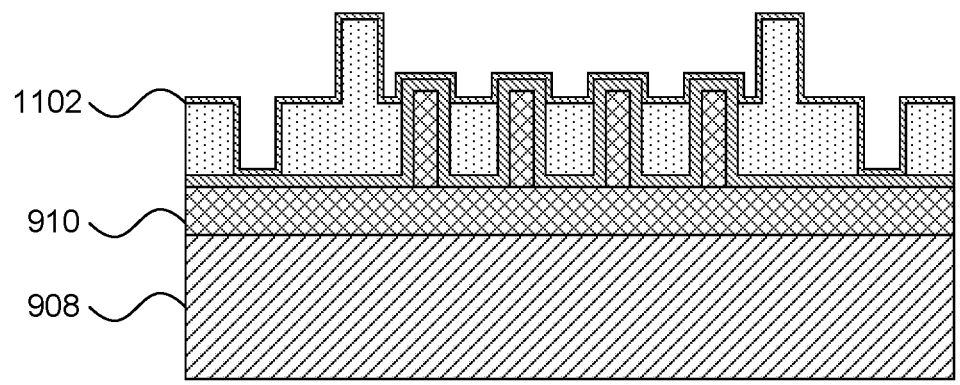
FIG. 11 is a diagram of a step in the formation of an anode structure in accordance with the present principles.

Referring now to FIG. 11, a step in the formation of an anode structure 106 is shown. Additional material 1102 is conformally deposited on the liner 904 and may have a thickness of about 300 nm to about 1,000 nm. The additional material 1102 may be formed from a titanium seed layer or, alternatively, a multilayer of titanium, copper and/or nickel, and titanium. Other metals may be used instead, as appropriate.

Figure 12:
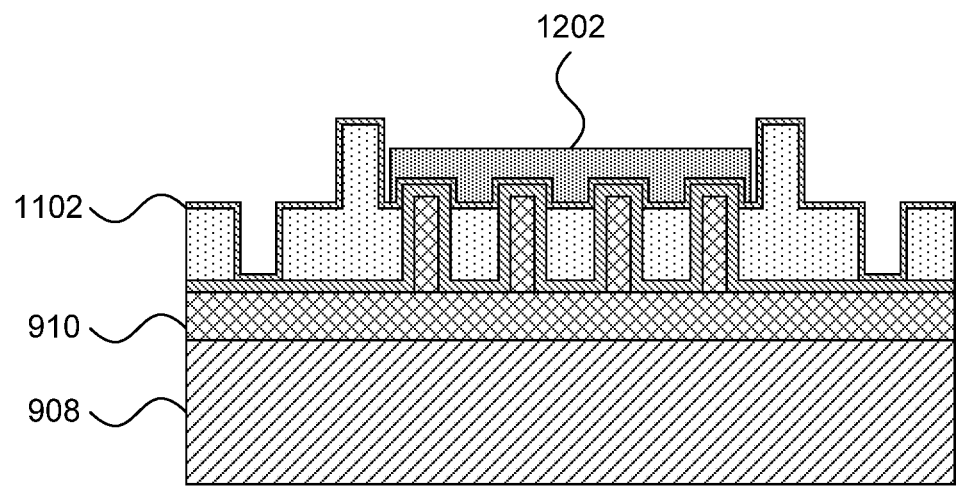
FIG. 12 is a diagram of a step in the formation of an anode structure in accordance with the present principles.

Referring now to FIG. 12, a step in the formation of an anode structure 106 is shown. Anode 1202 is plated on, using the additional material 1102 as a seed layer. A photoresist mask may be patterned to create openings where the anode material is to be deposited. A layer of, e.g., zinc or any other suitable anode material is electroplated and the photomask is removed. In one specific embodiment, the seed layer 1102 may be electroplated with a homogeneous solid that includes indium, bismuth, and zinc to form the anode 1202. The concentration of bismuth may be about 100 ppm to about 1,000 ppm, the concentration of indium may be about 100 ppm to about 1,000 ppm, and the remainder may be zinc. Alternatively, the anode 1202 may be formed from pure zinc. It is contemplated that the anode may have an exemplary thickness between about 1 µm and about 50 µm thick, but other thicknesses may be used as appropriate. Excess material from the seed layer 1102 may also be removed using the RIE process.

Figure 13:
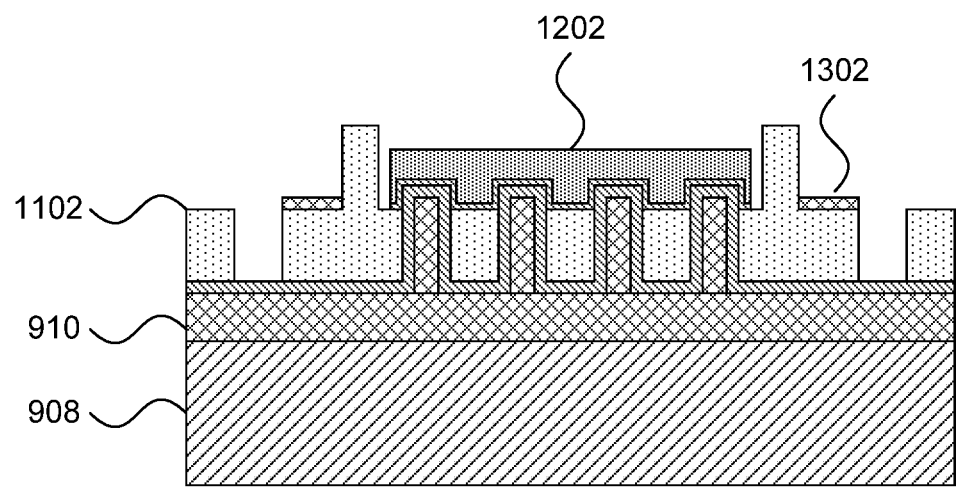
FIG. 13 is a diagram of a step in the formation of an anode structure in accordance with the present principles.

Referring now to FIG. 13, a step in the formation of an anode structure 106 is shown. Adhesive seal rings 1302 are formed by, e.g., spinning on a photopatternable polymer thermoplastic adhesive. The adhesive material is exposed, developed, and cured to form the pads 804. It should be noted that, in an alternative embodiment, the adhesive pads 1302 may be applied to, e.g., walls 104.

In an alternative embodiment, the adhesive pads 1302 may be replaced by a metallic joint (e.g., formed from indium), with the seed layer 1102 optionally being left in place. This can provide alternative electrical access to the anode 106.

Figure 14:
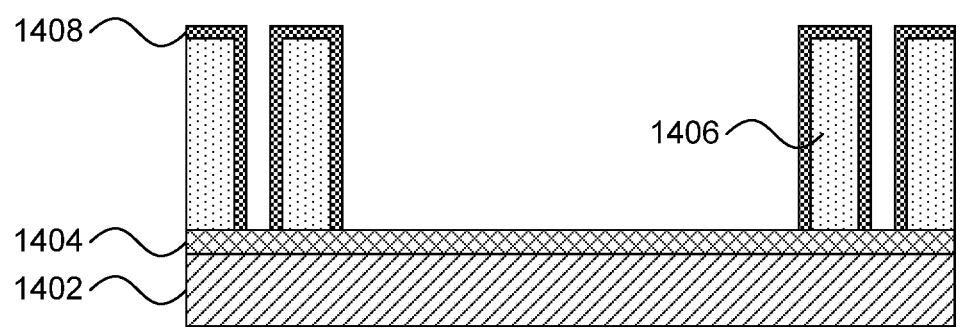
FIG. 14 is a diagram of the formation of vertical battery walls in accordance with the present principles.

Referring now to FIG. 14, the formation of the walls 104 is shown. A substrate layer of, e.g., silicon, is bonded to a handler 1402 made of, e.g., glass using an adhesive 1404. The substrate is then etched using a directional etch such as RIE to form walls 1406. A dielectric layer 1408 is formed using, e.g., CVD to form a layer between about 0.5 µm and about 1.0 µm thick. The dielectric layer 1408 may be formed from, e.g., silicon dioxide or silicon nitride.

Figure 15:
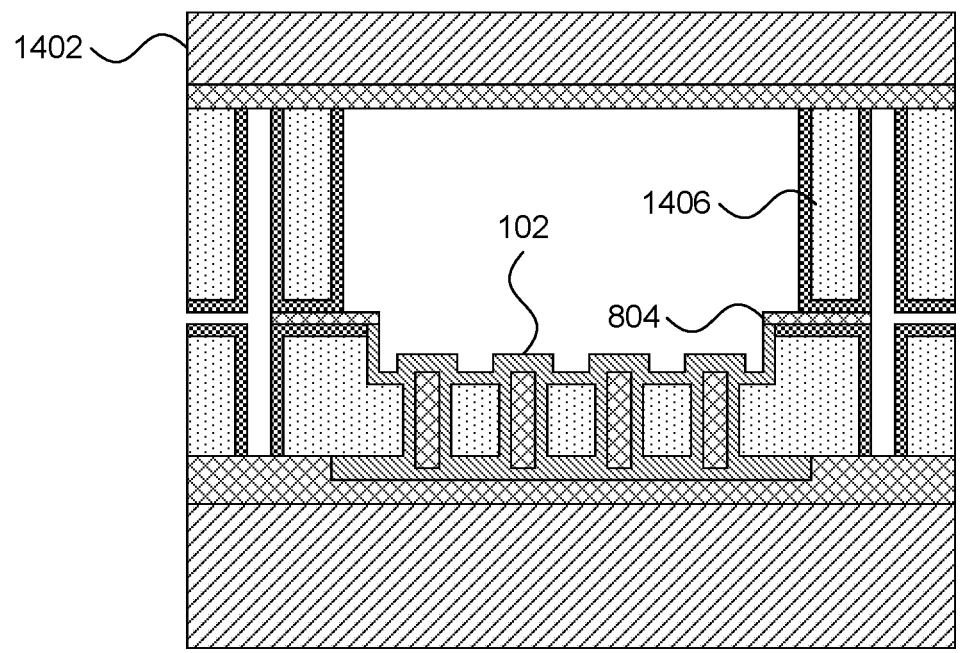
FIG. 15 is a diagram of a step in the assembly of a microbattery structure in accordance with the present principles.

Referring now to FIG. 15, a step in the assembly of the microbattery structure 100 is shown. The wall handler 1402 is used to position the walls 1406 above the adhesive layer 804 of the cathode structure 102. The walls 1406 are thereby bonded to the cathode structure 102. The walls 1406 may be sealed to the cathode structure 102 by applying high pressure and/or heat. In one exemplary embodiment, pressures between about 0.1 MPa and about 10 MPa may be used for a seal area on the order of about 100 mm².

Figure 16:
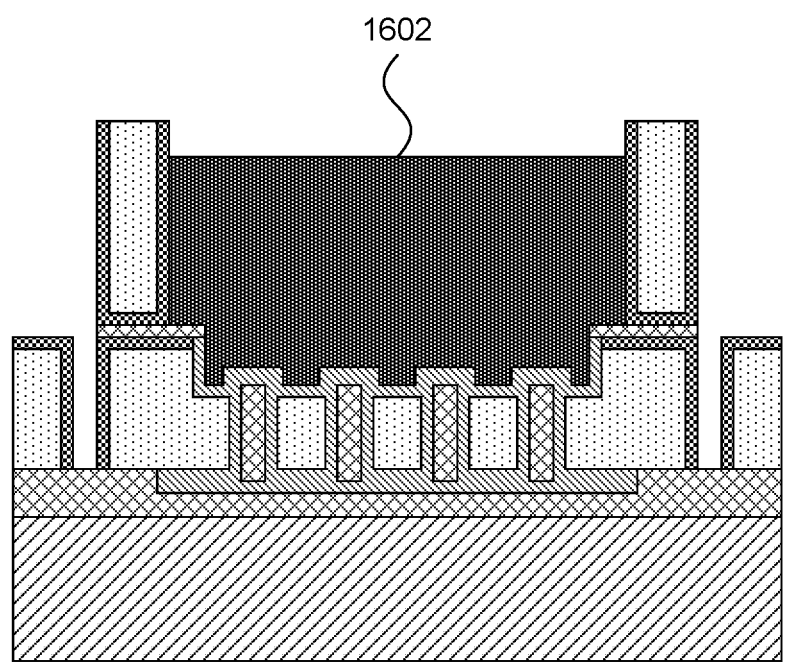
FIG. 16 is a diagram of a step in the assembly of a microbattery structure in accordance with the present principles.

Referring now to FIG. 16, a step in the assembly of the microbattery structure 100 is shown. The adhesive holding the wall handler 1402 onto the walls 1406 is ablated with a laser through the glass handler and the wall handler 1402 is removed. The remaining handler adhesive can then be removed by ashing. The space between the walls is filled with cathode material 1602. In one embodiment, the cathode material 1602 may be formed from manganese dioxide, but it should be understood that any appropriate cathode material may be used instead. Cathode material 1602 can be electroplated nickel hydroxide or a mixture of manganese dioxide, with or without a binder. An electrolyte solution such as, e.g., zinc chloride may be added as well.

Figure 17:
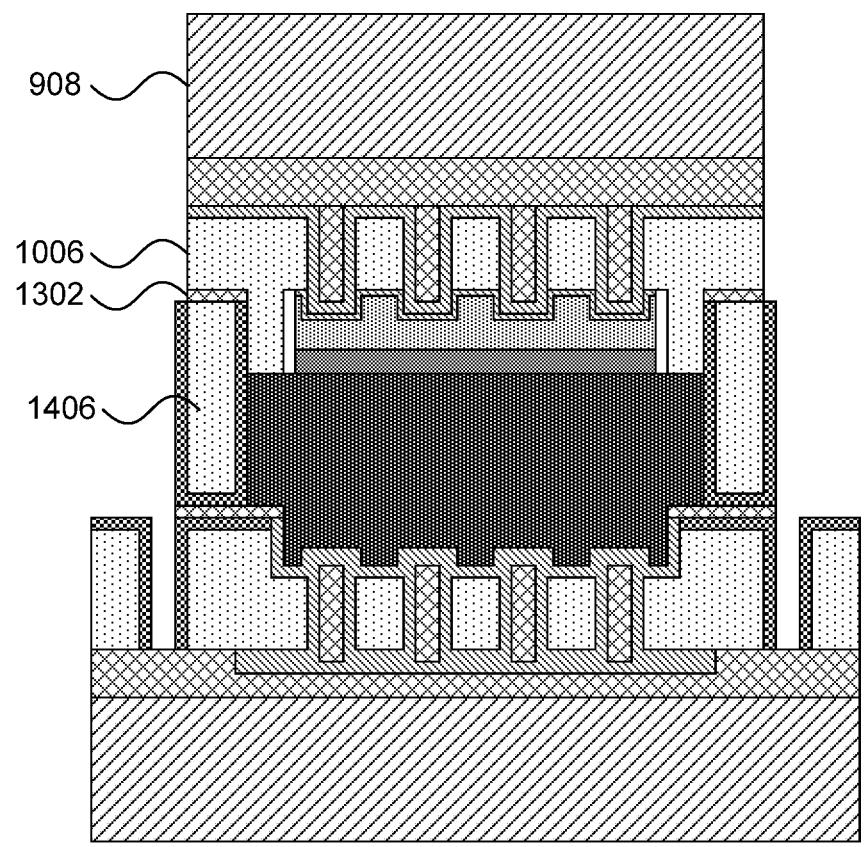
FIG. 17 is a diagram of a step in the assembly of a microbattery structure in accordance with the present principles.

Referring now to FIG. 17, a step in the assembly of the microbattery structure 100 is shown. A spacer 116 is formed or placed on the anode 1202 and the anode handler 908 is used to position the anode structure 1004 such that alignment rim 1006 aligns with the walls 1406. The adhesive pads 1302 contact the walls 1406 to bond the anode structure 1004 onto the walls 1406.

The spacer 116 may be infused with an electrolyte material. In an exemplary embodiment, the electrolyte material may include one or more of ammonium chloride, an aqueous salt solution such as potassium hydroxide, zinc chloride, or zinc acetate with an additive such as zinc oxide. The spacer 116 may be formed from, for example, a flexible porous material, a gel, or a sheet having an exemplary thickness between about 10 µm and about 100 µm formed from cellulose, cellophane, polyvinyl acetate (PVA), a PVA/cellulose blend, polyethylene, polypropylene, or a mixture of polyethylene and polypropylene. In one embodiment, the spacer 116 may be deposited by dispensing the electrolyte material. The electrolyte material may be deposited using an ink jet, robotic placement, or a spin-on process.

Figure 18:
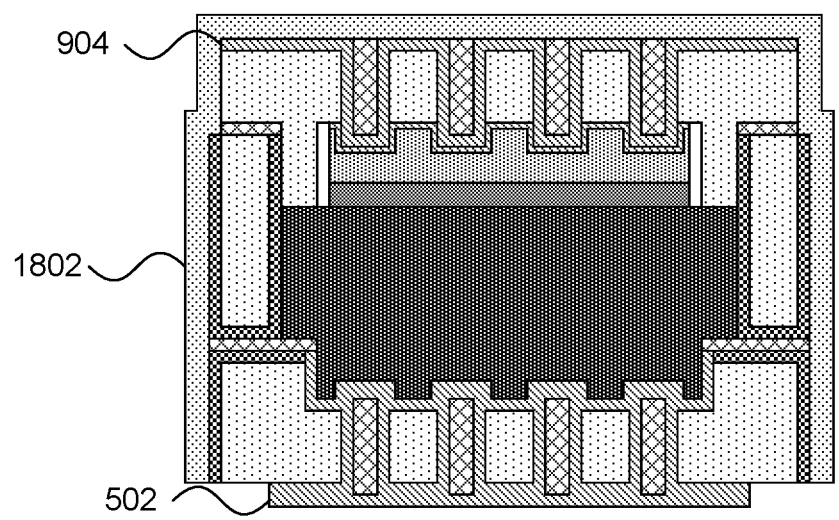
FIG. 18 is a diagram of a step in the assembly of a microbattery structure in accordance with the present principles.

Referring now to FIG. 18, a step in the assembly of the microbattery structure 100 is shown. A metal overcoat 1802 is applied to the structure, forming an electrical contact with the top vias and liner 904. The metal overcoat 1802 thereby provides electrical access to anode 106. The cathode handler 602 may be removed to separate the complete microbattery structure 100 and expose the cathode liner 502, which acts as the cathode contact. As noted above, the metal overcoat 1802 may be applied from above or may be applied conformally using, e.g., ALD, CVD, LPCVD, or sputtering instead.

Although it is specifically contemplated that the metal overcoat may cover every surface except the bottom of the cathode structure 102, it should be understood that an alternative embodiment may leave the top of the anode structure 106 exposed instead.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 19:
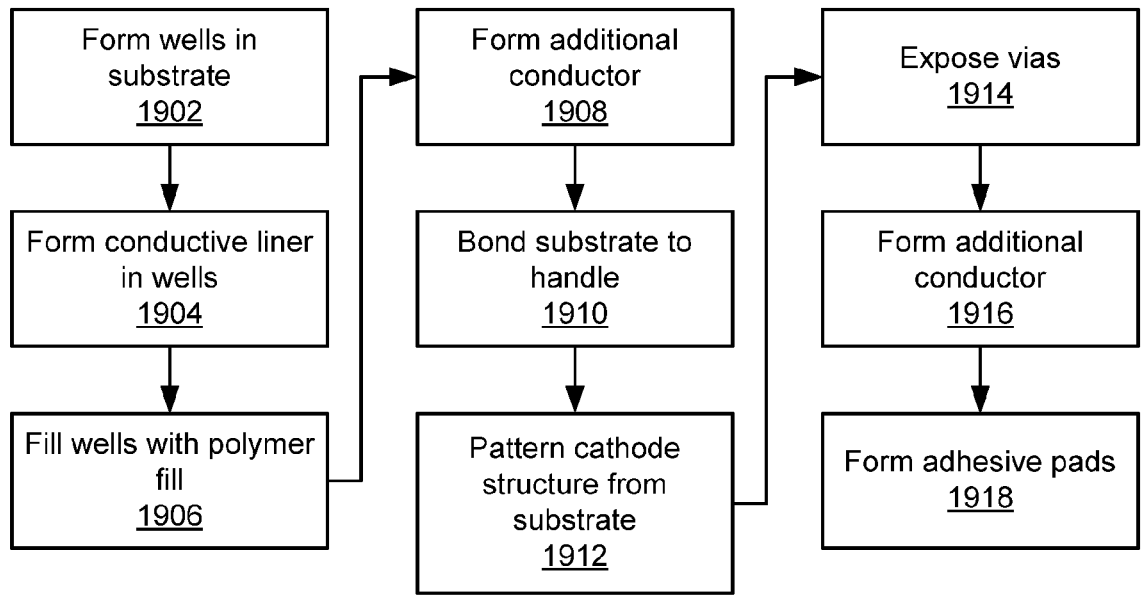
FIG. 19 is a block/flow diagram of a method for forming a cathode structure in accordance with the present principles.

Referring now to FIG. 19, a method of forming a cathode structure 102 is shown. Block 1902 forms wells 204 in a substrate 202 using, e.g., photolithography and RIE. Block 1904 conformally forms a conductive liner 302 in the wells 204 and block 1906 fills the wells 204 with, e.g., a polymer fill 402. The polymer fill may be formed by bonding the substrate 202 to a surface to force polymer adhesive into the wells 402.

Block 1908 forms an additional layer of conductor 502 over the exposed ends of the wells 204. This conductor 502 may be formed from the same material as the liner 302 or may be any other appropriate conductive material, forming a cathode contact in the finished device.

Block 1910 bonds the substrate 202 to a handler 602 using, e.g., adhesive 604. The substrate 202 is patterned in block 1912 and block 1914 exposes the vias with a further etch. Block 1916 forms a layer of additional conductor material 802 on the exposed vias and block 1918 forms adhesive seal rings.

Figure 20:
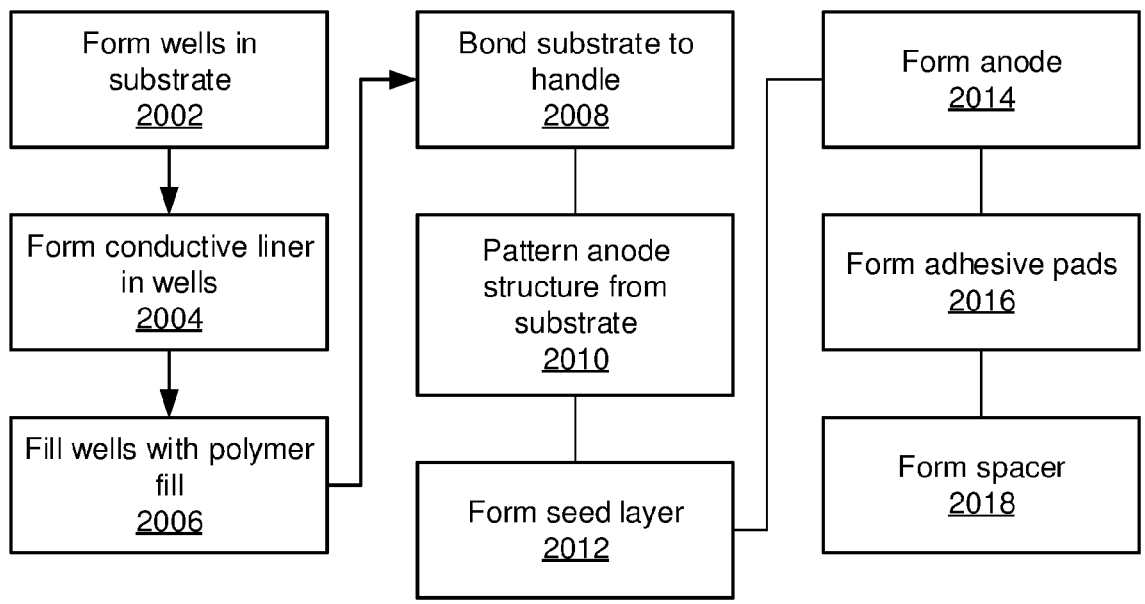
FIG. 20 is a block/flow diagram of a method for forming an anode structure in accordance with the present principles.

Referring now to FIG. 20, a method of forming an anode structure 106 is shown. Block 2002 forms wells 204 in a substrate 202 and block 2004 forms a conductive liner 302 in the wells 204. In block 2006 the wells 2004 are filled with a polymer 906 and in block 2008 the substrate 202 is bonded to a handler 908. In one embodiment, blocks 2006 and 2008 may be combined, with the bonding adhesive being forced into the wells to form the polymer fill 906.

Block 2010 patterns the anode structure 1004 from the substrate, exposing the vias. Block 2012 forms a seed layer over the anode structure 1004 and vias so that block 2014 can form the anode 1202 on the seed layer using, e.g., electroplating and a photolithography process. Block 2016 forms adhesive pads 1302 on the anode structure 1004. Block 2018 then forms the spacer 104 on the anode 1202, with the spacer 104 including a structural material and an electrolytic material.

Figure 21:
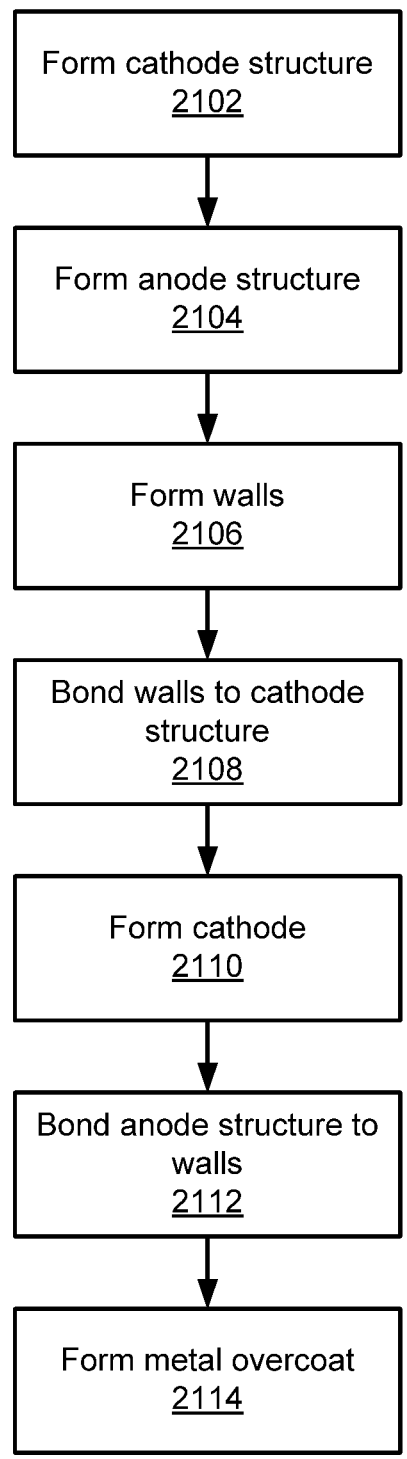
FIG. 21 is a block/flow diagram of a method for assembling a microbattery structure in accordance with the present principles.

Referring now to FIG. 21, a method of constructing a microbattery structure 100 is shown. Block 2102 forms the cathode structure 102, for example as described in FIG. 19 above. Block 2104 forms the anode structure 106, for example as described in FIG. 20 above. Block 2106 forms the walls 104 by, for example, etching appropriately sized walls from a silicon substrate that is bonded to a handler.

Block 2108 bonds the walls 104 to the cathode structure 102, using adhesive and pressure to form the bond. Once the walls 104 are attached, cathode 1602 is formed in the cavity in block 2110. Block 2112 bonds the anode structure 106 to the walls 104. Block 2114 then forms a metal overcoat 1802 over the stack. The metal overcoat 108 forms an anode contact and the conductor 502 is left exposed on the bottom, forming a cathode contact. It should be noted that the order of assembly may be reversed, with the walls 104 being attached first to the anode structure 106 and with the cathode 102 being attached last.

Having described preferred embodiments of a microbattery with through-silicon via electrodes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of forming a battery, comprising:
    forming an anode substrate;
    forming a cathode substrate;
    forming anode through vias in the anode substrate;
    forming cathode through vias in the cathode substrate;
    forming an anode conductive liner on the anode substrate, in contact with the anode through vias;
    forming an anode on the anode conductive liner;
    forming a cathode conductive liner on the cathode substrate, in contact with the cathode through vias;
    forming a cathode on the cathode conductive liner;
    assembling the anode substrate and the cathode substrate to form a battery structure; and
    forming a conductive overcoat over the anode substrate and the cathode substrate to seal a cavity formed by the anode substrate and the cathode substrate.

2. The method of claim 1, wherein forming the conductive overcoat comprises forming an electrical connection between the conductive overcoat and only one of the group consisting of the anode through vias and the cathode through vias.

3. The method of claim 1, further comprising forming an insulating fill in the through vias.

4. The method of claim 3, wherein the insulating fill comprises a polymer adhesive.

5. The method of claim 1, wherein forming the conductive overcoat comprises leaving an external surface of the anode exposed.

6. The method of claim 1, wherein forming the conductive overcoat comprises leaving an external surface of the cathode exposed.

7. The method of claim 1, wherein assembling the anode substrate and the cathode substrate comprises positioning vertical walls on the cathode substrate and positioning the anode substrate on the vertical walls.

8. The method of claim 7, wherein assembling the anode substrate and the cathode substrate comprises connecting the anode substrate to the vertical walls with a metal joint and connecting the vertical walls to the cathode substrate with a polymer adhesive.

9. The method of claim 1, wherein the cathode substrate has a greater diameter than the anode substrate, such that a rim of exposed cathode substrate is exposed at a point of contact between the anode and the cathode after assembly.

10. A method of forming a battery, comprising:
    forming an anode substrate;
    forming a cathode substrate having a greater diameter than a diameter of the anode substrate;
    forming through vias in at least one of the anode substrate and the cathode substrate that pierce the respective substrate;
    forming an anode conductive liner on the anode structure;
    forming an anode on the anode conductive liner;
    forming a cathode conductive liner on the cathode substrate;
    forming a cathode on the cathode conductive liner;
    assembling the anode substrate and the cathode substrate to form a battery structure, such that a rim of exposed cathode substrate is exposed at a point of contact between the anode and the cathode; and
    forming a conductive overcoat over the anode substrate and the cathode substrate to seal a cavity formed by the anode substrate and the cathode substrate.

11. The method of claim 10, wherein forming through vias comprises forming anode through vias in the anode substrate that are in contact with the anode conductive liner and forming cathode through vias in the cathode substrate that are in contact with the cathode conductive liner.

12. The method of claim 11, wherein forming the conductive overcoat comprises forming an electrical connection between the conductive overcoat and only one of the group consisting of the anode through vias and the cathode through vias.

13. The method of claim 10, further comprising forming an insulating fill in the through vias.

14. The method of claim 13, wherein the insulating fill comprises a polymer adhesive.

15. The method of claim 10, wherein assembling the anode substrate and the cathode substrate comprises positioning vertical walls on the cathode substrate and positioning the anode substrate on the vertical walls.

16. A method of forming a battery, comprising:
    forming an anode substrate;

forming a cathode substrate;
forming through vias in at least one of the anode substrate and the cathode substrate that pierce the respective substrate;
foiling an anode conductive liner on the anode structure;
forming an anode on the anode conductive liner;
forming a cathode conductive liner on the cathode substrate;
forming a cathode on the cathode conductive liner;
assembling the anode substrate and the cathode substrate to form a battery structure by connecting vertical walls to the cathode substrate with a polymer adhesive and connecting the anode substrate to the vertical walls with a metal joint; and
forming a conductive overcoat over the anode substrate and the cathode substrate to seal a cavity formed by the anode substrate and the cathode substrate.

17. The method of claim 16, wherein forming through vias comprises forming anode through vias in the anode substrate that are in contact with the anode conductive liner and forming cathode through vias in the cathode substrate that are in contact with the cathode conductive liner.

18. The method of claim 17, wherein forming the conductive overcoat comprises forming an electrical connection between the conductive overcoat and only one of the group consisting of the anode through vias and the cathode through vias.

19. The method of claim 16, wherein the cathode substrate has a greater diameter than the anode substrate, such that a rim of exposed cathode substrate is exposed at a point of contact between the anode and the cathode after assembly.

20. The method of claim 16, further comprising forming an insulating fill in the through vias.

* * * * *